United States Patent [19]
Roedig

[11] Patent Number: 5,379,669
[45] Date of Patent: Jan. 10, 1995

[54] PRECISION MITER GAUGE

[76] Inventor: Joseph L. Roedig, 8824 E. Old Spanish Trail, Tucson, Ariz. 85710

[21] Appl. No.: 109,948

[22] Filed: Aug. 23, 1993

[51] Int. Cl.⁶ .............................................. B27B 25/08
[52] U.S. Cl. ..................... 83/421; 83/435.1; 83/437; 83/477.2; 33/536; 33/641
[58] Field of Search .............. 83/421, 425, 435.1, 83/437, 438, 468, 468.3, 468.7, 477.2, 581; 33/465, 471, 534, 536, 537, 538, 640, 641

[56] References Cited

U.S. PATENT DOCUMENTS

| | | | |
|---|---|---|---|
| 2,968,325 | 1/1961 | Wandvik | 83/437 |
| 3,195,238 | 7/1965 | Grenell | 33/536 |
| 4,464,962 | 8/1984 | Myhre | 83/425 |
| 4,651,435 | 3/1987 | Wettstein | 33/536 |
| 4,809,441 | 3/1989 | Mann | 33/536 |
| 4,884,604 | 12/1989 | Rice et al. | 33/537 X |
| 5,097,601 | 3/1992 | Pollak et al. | 83/437 X |

OTHER PUBLICATIONS

"Aunton's Fine Wood Working," published by The Taunton Press, Inc. of Newtown, Conn., p. 74, by Daniel Westberg, Apr. 1992.
"Aunton's Fine Wood Working," published by The Taunton Press, Inc. of Newtown, Conn., p. 60, by Tom Rose, Aug., 1992.

Primary Examiner—Richard K. Seidel
Assistant Examiner—Raymond D. Woods
Attorney, Agent, or Firm—Antonio R. Durando; Harry M. Weiss

[57] ABSTRACT

A precision miter gauge that consists of a sine-plate assembly mounted on a guide bar for engagement in a conventional table-saw miter slot. The sine-plate assembly comprises a stationary plate substantially perpendicular to the guide bar and a hinged plate pivotally connected to the stationary plate by a hinge pin having an axis of rotation disposed at a predetermined distance from the hinged plate, so as to form a variable angle between the two plates. A gauge block adapted to produce exact predetermined angles is positioned between the stationary plate and a reference pin pivotally coupled to the hinged plate and having an axis of rotation disposed at the same predetermined distance from the hinged plate as the hinge pin's axis. As the gauge block is firmly secured between the reference pin and the stationary plate, the hinged plate provides a solid and precise fence for cutting a workpiece at the selected angle.

18 Claims, 8 Drawing Sheets

PRECISION MITER GAUGE

BACKGROUND OF THE INVENTION

1. Field of the Invention

In general this invention is related to devices for cutting precision angles in a workpiece; in particular, the invention describes a new and improved miter gauge that combines exact-alignment features allowing a degree of precision within seconds of a degree in woodworking.

2. Description of the Related Art

The ability to cut precise angles to fit adjoining parts is critical to machinists and woodworkers. Picture frames, windows, doors and furniture are common examples of articles of manufacture that are assembled from parts having mitered joints that require a very close fit in order to result in an acceptable product. Thus, several tools have been developed over the years to aid woodworkers in obtaining such precise cuts.

The miter gauge is a tool designed to achieve this goal that is normally provided as standard equipment with table saws. It consists of a guide bar that rides horizontally in parallel to the blade in a machined miter slot on the top of the table saw; a fence assembly that rotates around a pivot axis through the guide bar and perpendicular to the top of the table saw; a protractor scale for setting the fence assembly to various angles with respect to the saw blade; and a lock knob to hold the fence in the desired position. The machined miter slot on the top of the table saw is parallel to the blade, so that the guide bar sliding within it is also kept parallel to the blade at all times. The protractor scale is adapted to utilize the guide bar as a reference point for measuring the angles at which the fence assembly is set with respect to the blade as it is rotated around the pivot point. Some miter gauges also have built-in stops to allow quick settings to the more commonly used angles.

Thus, the performance of a miter gauge depends on how well the guide bar fits in the miter slot in the table saw and on how accurately the fence's angle can be set. Any play between the bar and the slot may result in lateral movement of the bar as it slides up and down the slot, which in turn produces a variation in the angle of the fence with respect to the blade affecting the accuracy of the cut. Similarly, the fence's angle is set by visually matching a position marker on the fence assembly with a mark on the protractor scale and the procedure necessarily involves a subjective determination in finding the correct position. Thus, in practice, these two sources of error have greatly reduced the theoretical accuracy of standard miter gauges and a variety of improved tools and accessories have been developed for specific purposes.

Some gauges use the notion of complementary angles to achieve accuracy in cutting 45-degree angles for adjoining parts. A 90-degree square is mounted on the fence of the conventional miter gauge and set with both faces at approximately 45 degrees with respect to the blade. One workpiece is cut by using one face of the square and the adjoining workpiece by using the other face, thus ensuring a complementary fit between the two pieces (that is, the angles of both cuts necessarily add to 90 degrees) even if each cut is not exactly at 45 degrees. A variety of these tools is shown on page 74 of the April 1992 issue of "Fine Woodworking" magazine, published by The Taunton Press, Inc., of Newtown, Conn.

These accessories are limited in their use because they only address the issue of ensuring a good fit between complementary angles. They do not improve the precision of miter gauges in cutting angles in general, which is still dependent on the precise parallel alignment of the guide bar with the saw blade, the precise alignment of the protractor scale with the guide bar, and the precise setting of the fence at the desired angle as measured by the scale. These three sources of error remain unimproved when the gauge is used for non-complementary cuts.

Another type of improvement is illustrated on page 60 of the August issue of the magazine referenced above. It consists of a sine-bar assembly used as an accessory with a standard miter gauge to set the angle of the fence to a predetermined precise quantity. In order to utilize the accessory, a second miter slot on the top of the table saw is required, also parallel to the blade, and it is used with retaining wedges to align a conventional carpenter square at right angle with the blade. A sine bar and gauge blocks are then used to form known angles with the square and correspondingly to set the angle of the miter-gauge fence. The sine-bar assembly is then removed and the miter gauge is used in a conventional way to cut at the selected angle.

This gauge accessory provides improved precision over the performance of standard miter gauges, but it is cumbersome to use because of the various separate components and steps involved in setting the fence to the desired angle. First, the square has to be aligned with the second miter slot in the table (which requires the use of retaining wedges firmly held in the slot); second, the fence of the miter gauge is to be aligned with the square; finally, the sine-bar assembly is placed between the square and the fence and used to rotate the fence to the desired angle while all other parts are held stationary. This device in theory eliminates the subjective selection of the precise position of the fence by substituting its visual positioning with the introduction of an exact gauge block of predetermined thickness. In fact, though, each step requires a precise alignment of movable components and, therefore, represents a potential source of error.

In summary, all of the improvement devices found in the prior art retain most of the problems of standard miter gauges. Therefore, there is still a need for an improved miter gauge that permits the setting of the fence to precise angles with a minimum of movable parts and steps, which in turn results in minimal alignment errors.

SUMMARY OF THE INVENTION

One objective of this invention is an improved miter gauge that incorporates means for setting the angle of the miter fence to precise predetermined angles without reference to a protractor scale, thus eliminating the visual setting of the fence, a common source of error in conventional miter gauges.

Another goal of the invention is a miter gauge that comprises means for reducing the tolerance of the fit of the guide bar within the miter slot in the top of a conventional table saw, thus reducing the error introduced by the lateral play between the two as the bar slides within the slot.

Yet another goal of the invention is a miter gauge capable of providing angle settings having the same degree of precision of the cumulative tolerances in the machined components constituting its parts, preferably within a few seconds of a degree.

A final objective is the economical manufacture of a miter gauge according to the above-stated criteria. This is achieved by using commercially available components and materials, modified only to the extent necessary to fit the requirements of the invention.

Therefore, according to these and other objectives, the present invention consists of a sine-plate assembly mounted on a guide bar for engagement in a conventional table-saw miter slot. The sine-plate assembly comprises a stationary plate substantially perpendicular to the guide bar and a hinged plate pivotally connected to the stationary plate by means of a hinge pin having an axis of rotation disposed at a predetermined distance from the hinged plate, so as to form a variable angle between the two plates. A gauge block adapted to produce exact predetermined angles is positioned between the stationary plate and a reference pin pivotally coupled to the hinged plate and having an axis of rotation disposed at the same predetermined distance from the hinged plate as the hinge pin's axis. As the gauge block is firmly secured between the reference pin and the stationary plate, the hinged plate provides a solid and precise fence for cutting a workpiece at the selected angle.

Various other purposes and advantages of the invention will become clear from its description in the specification that, follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DESCRIPTION OF THE PREFERRED EMBODIMENT

The most important inventive features of the apparatus described in this disclosure relate to the incorporation of a sine plate assembly into a conventional miter gauge and the utilization of a cam mechanism in the guide bar for minimizing any play between the bar and the miter slot within which it slides during use. The unit is designed to enable a user to set the gauge to a predetermined angle without reference to a protractor scale, thus eliminating the errors inherent with such procedure.

Figure 1:
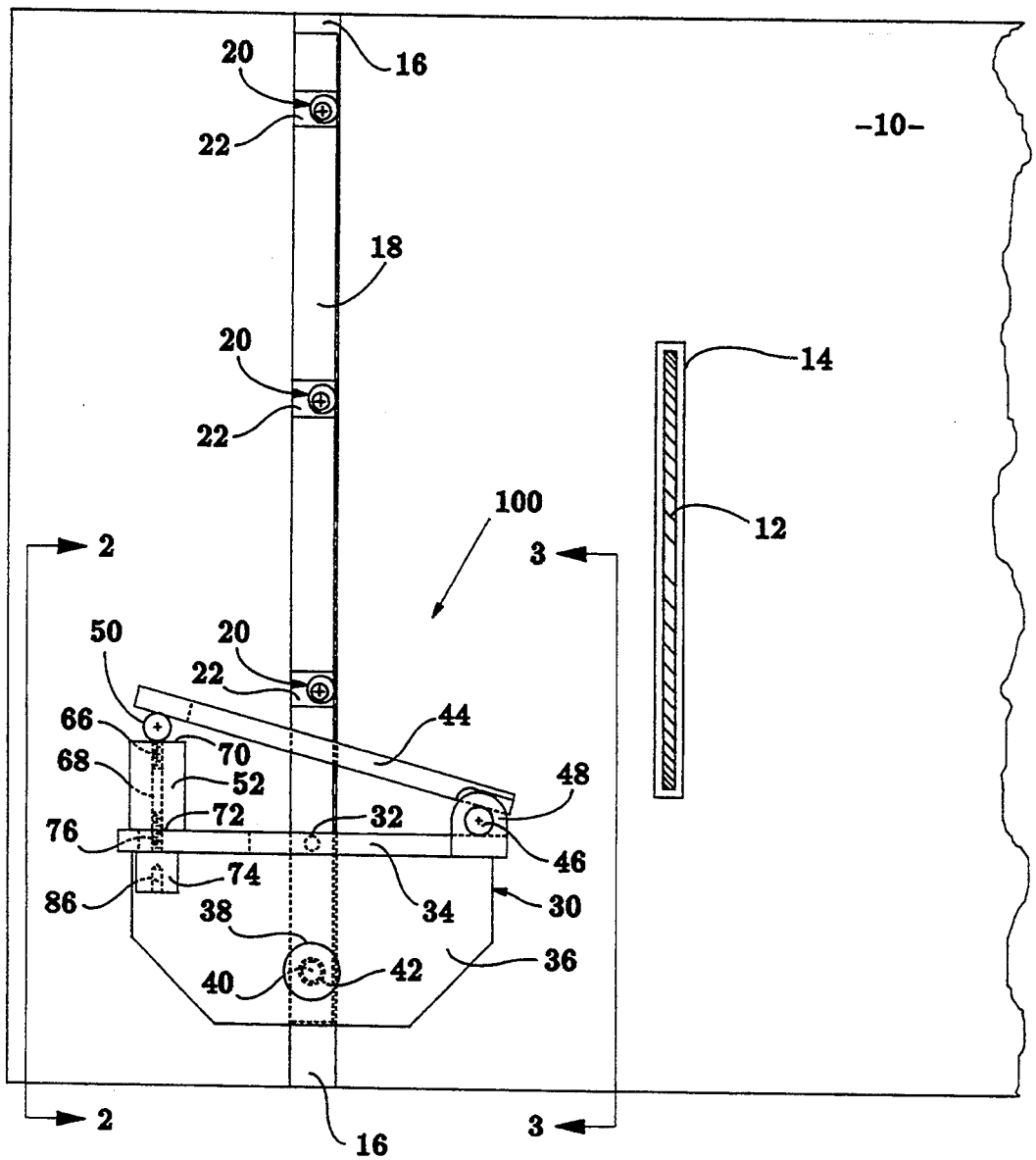
FIG. 1 is a plan view of a miter gauge according to the preferred embodiment of the present invention positioned for use on a conventional table-saw top.

Referring to the drawings, wherein like parts are designated throughout with like numerals and symbols, FIG. 1 illustrates in plan view the components of a precision miter gauge 100 according to the present invention. The gauge is shown positioned on the top 10 of a conventional table saw having a blade 12 protruding upward through an apposite blade slot 14 and rotating on a vertical plane to cut a workpiece that is pushed forward. The table top 10 includes a straight miter slot 16 placed across the length of the table and in substantially perfect parallel alignment with the blade 12. The miter slot 16 is preferably machined into the top of the table in order to ensure a uniform width throughout its length.

The precision miter gauge 100 of the invention comprises a guide bar 18 having a width equal to or slightly smaller than the width of the miter slot 16, so that the two may be slideably engaged with minimum play therebetween. In operating the gauge, the guide bar 18 provides the alignment of the tool with the blade 12 and the bar is slideably moved up and down along the slot while workpieces are being cut. Therefore, it is essential that the guide bar not be permitted any lateral movement within the miter slot that would distort its alignment, and therefore the alignment of the miter gauge, with respect to the blade.

Figure 4:
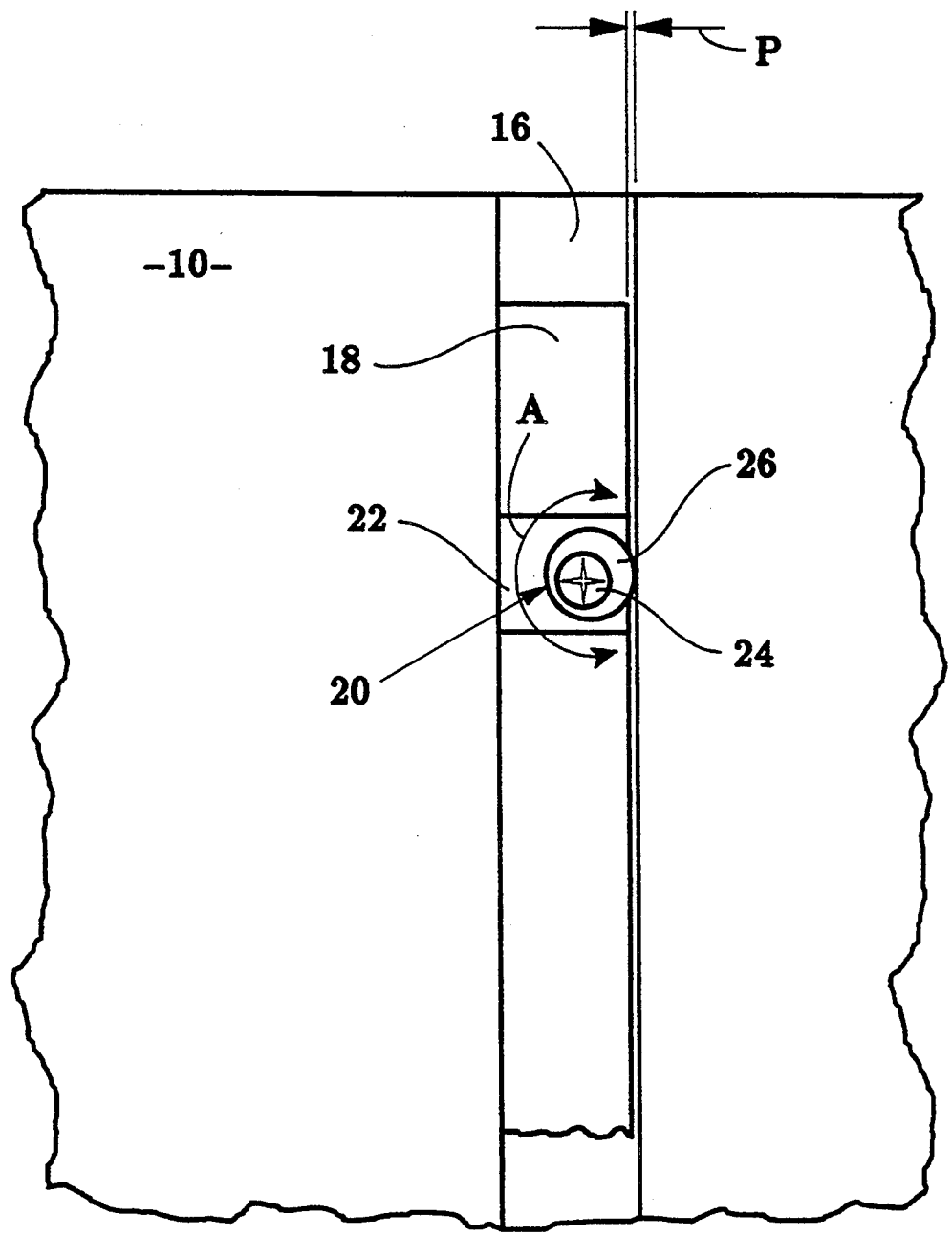
FIG. 4 is an enlarged partial plan view of one of the cam mechanisms seen in FIG. 1.

A close fit of the guide bar 18 within the miter slot 16 is ensured by at least two cam or eccentric mechanisms 20 disposed in transverse recesses 22 along the length of the bar and adapted to extend beyond the width of the bar to compensate for any play in the slot 16. As illustrated in the enlarged partial view of FIG. 4, each cam mechanism 20 comprises a cylindrical axle 24 releasably mounted in the recess 22 and an eccentric 26 rotatably mounted on the axle 24. The axle may consist of a screw or equivalent fastening means adapted to permit the rotation of the eccentric 26 when loosened and to lock it in place when tightened. The axle is positioned within the recess 22 so as to permit full rotation of the eccentric 26 in either direction, as illustrated by the arrow A in FIG. 4, and to cause the outward extension of the eccentric from the recess 22 to vary from zero to a predetermined maximum amount as the eccentric is rotated around the axle. In practice, I found that an eccentricity of about 3 millimeters, fully available to augment the width of the guide bar 18, is adequate to eliminate the play P in standard machined miter slots found in commercially available table saws.

Referring back to FIGS. 1-3, the gauge 100 of the invention comprises a miter-sine assembly 30 pivotally mounted on the guide bar 18 by means of a dowel pin or equivalent axle mechanism 32 connecting the assembly 30 to the bar 18. The miter-sine assembly comprises a vertical stationary plate 34 that is fixedly attached or integral with a horizontal mounting plate 36; the stationary plate 34 is rotatably anchored to the guide bar 18 through the dowel pin 32, thus permitting pivotal motion of the entire miter-sine assembly 30 with respect to the bar 18. This motion is important to allow a user to position the stationary plate 34 in perfect perpendicular relationship to the blade 12 after the guide bar 18 has been installed within the miter slot 16 and snugly fit thereto by means of the cam mechanisms 20. Thus, the miter-sine assembly 30 is connected to the guide bar 18 in a fashion that results in having the stationary plate 34 approximately perpendicular to the guide bar. The mounting plate 36 (and therefore the entire miter-sine assembly 30) is then rigidly fastened to the guide bar by tightening a lock handle 38 so as to cause it to press against the guide bar 18, thus locking the assembly 30 in place. As also seen in the side view of FIG. 2, the lock handle 38 is screwably mounted on a threaded stud 40 attached to the guide bar and protruding upward through a calibration aperture 42 in the mounting plate. The aperture 42 need only be sufficiently larger than the stud 40 to permit the slight rotation of the assembly 30 that is necessary to dispose it perpendicularly to the blade 12 of the table saw.

Figure 5:
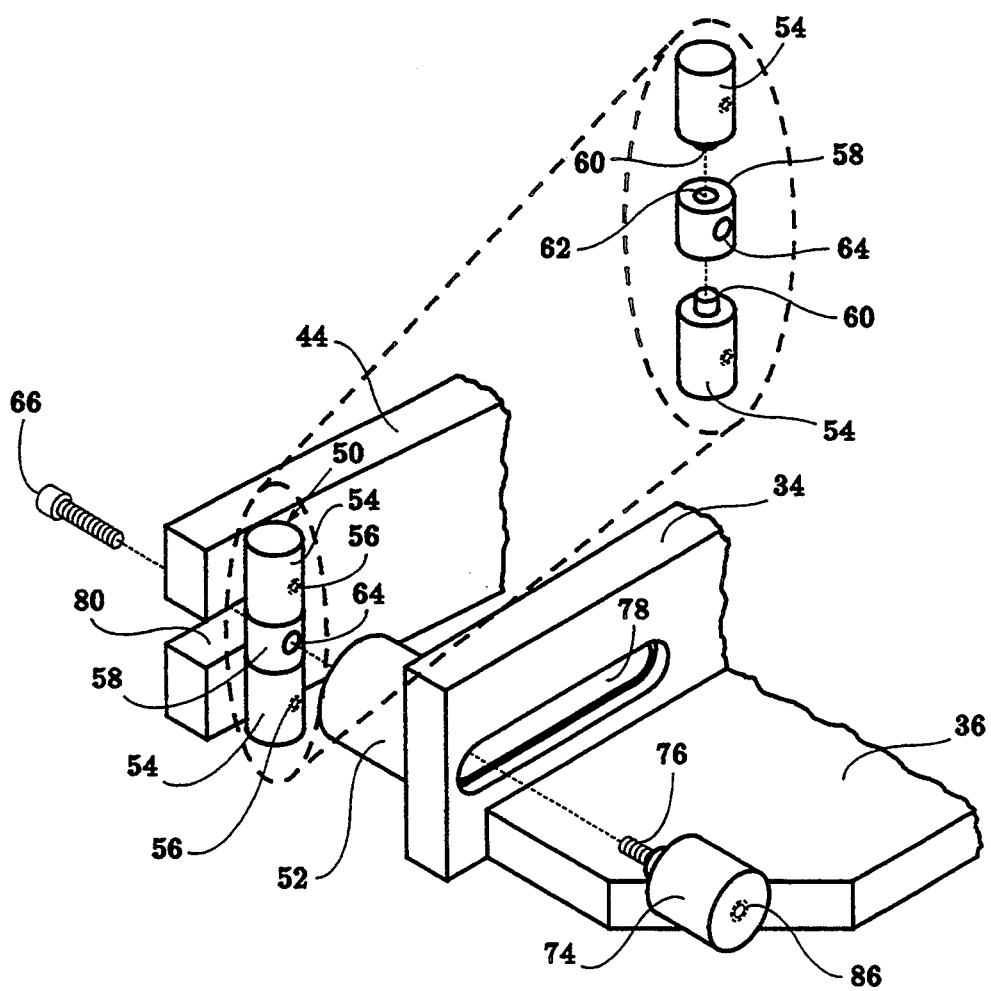
FIG. 5 is an enlarged partial perspective view of the reference pin assembly of the invention, also containing a partial exploded view thereof.

The miter-sine assembly 30 also comprises a vertical hinged plate 44 adapted to form a variable angle with the stationary plate 34. The hinged plate 44 is hingedly connected to the stationary plate 34 by means of pivot means that connect the back end of the two plates and allow the motion of the hinged plate from a position exactly parallel to the stationary plate (corresponding to an angle of 0 degrees) to a position forming at least a 45-degree angle therewith, preferably 55 to 60 degrees for greater flexibility of use. In the preferred embodiment of the invention, such pivot means consists of a cylindrical pivot pin 46 fixedly attached to the bottom of the hinged plate and rotatably mounted through conforming slots 47 on a pair of pivot-pin retainers 48 that are integral with or fixedly attached to the top of the stationary plate 34 (see FIGS. 1 and 8). Obviously, the same function could be provided by attaching the pivot pin to the stationary plate and the pivot-pin retainers to the hinged plate. The pivot pin 46 and the retainers 48 are connected in such a way that the bottom of plate 44 and the top of plate 34 are precisely tangential to the pivot pin at all times, irrespective of the angle being formed between the two plates. A reference pin assembly 50 is attached to the front end of the hinged plate 44 to provide a structure for aligning the plate 44 in parallel with the stationary plate 34 (when the angle between the two is zero degrees) or for installing a gauge block 52 therebetween to form a predetermined angle between the two plates, as seen in FIG. 1. In the preferred embodiment shown in the drawings and particularly in FIG. 5, the reference pin assembly 50 consists of two cylindrical reference pins 54 that have exactly the same diameter as the pivot pin 46 and that are fixedly attached (tangentially), such as by screws 56, to the bottom of the hinged plate 44. As better illustrated in the exploded portion of FIG. 5, a cylindrical gauge-block pivot mount 58 having the same diameter of the reference pins 54 is rotatably connected to the two pins 54 by means of longitudinal axles 60 slideably mated to an axial perforation 62 in the pivot mount 58. A radial perforation 64 in the gauge-block pivot mount 58 is also provided so that a gauge-block mount screw 66 may be installed radially therethrough. Thus, the pivot mount 58 can rotate with respect to the fixed reference pins 54 and the screw 66 can assume various radial positions with respect thereto and with respect to the hinged plate 44. The ability of the gauge-block mount screw 66 to assume such varied radial positions is critical to the proper functioning of the device of the invention, as will become apparent from the discussion given below. The screw 66 is used to install a gauge block 52 of predetermined thickness between the reference pin assembly 50 and the stationary plate 34, so as to form a corresponding predetermined angle between the stationary plate and the hinged plate 44. Obviously, gauge blocks having different thicknesses must be used to produce different angles between the plates. Each gauge block 52 comprises a longitudinal axial threaded perforation 68 (seen in FIG. 8) for engagement with the screw 66 so that the block may be brought to contact the outer cylindrical surface of the pivot mount 58 and be firmly tightened thereto. The top surface 70 of each block 52 must be perfectly flat, perpendicular to the main axis of the block, and larger than the radial perforation 64, so that the surface 70 lies tangentially to the pivot mount 58 after being connected thereto by means of screw 66. Similarly, the bottom surface 72 of each block 52 must be perfectly flat and perpendicular to the main axis of the block, so that the surface 72 may lie perfectly flat on and parallel to the stationary plate 34. A sliding knob 74 having an axially protruding screw 76 is provided to engage the perforation 68 in the gauge block 52 through a stationary-plate longitudinal slot 78 and to firmly secure the block 52 with its main axis perpendicular to the stationary plate 34. The slot 78 is disposed along the length of the stationary plate 34 so as to accommodate all positions that different-thickness gauge blocks 52 may assume as a result of the corresponding rotation of the pivot mount 58. Finally, a hinged-plate slot 80 at least as wide as the pivot mount 58 is provided in the hinged plate 44 to facilitate the rotation of the pivot mount.

Figure 2:
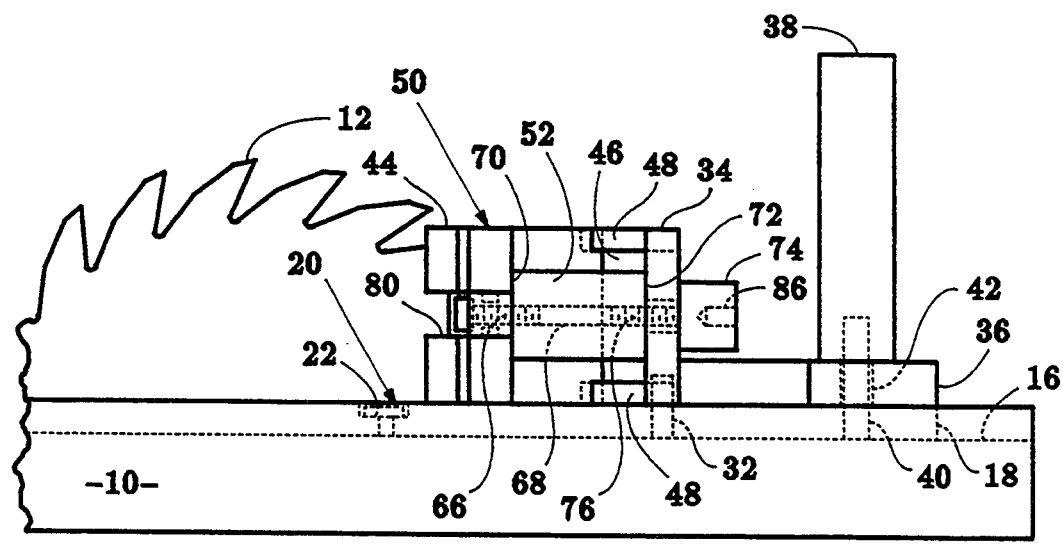
FIG. 2 is an elevational view of the miter gauge of FIG. 1 as seen from line 2—2 in that figure.
Figure 3:
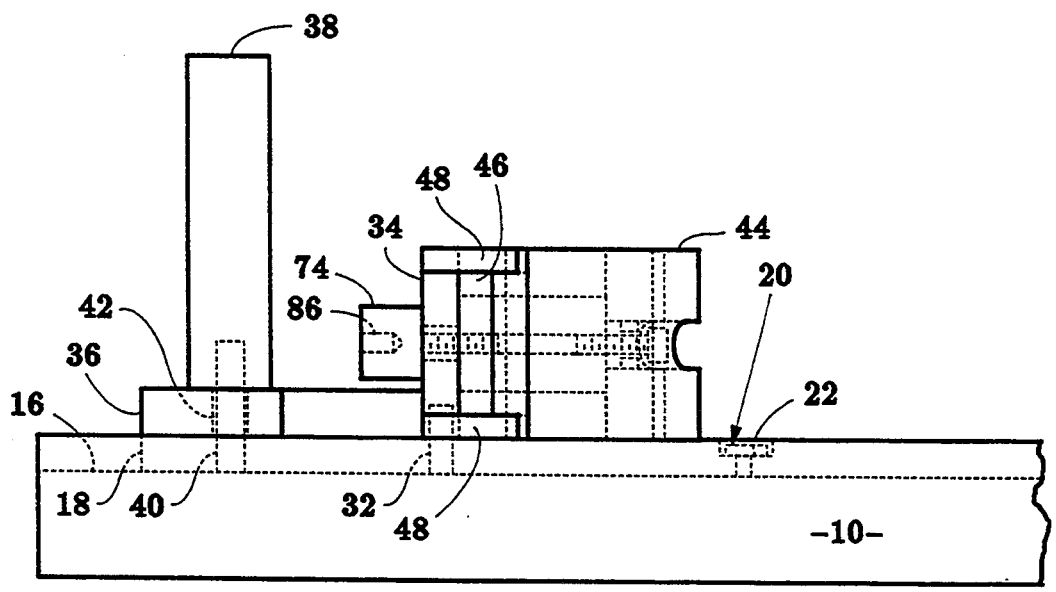
FIG. 3 is an elevational view of the miter gauge of FIG. 1 as seen from line 3—3 in that figure.
Figure 6:
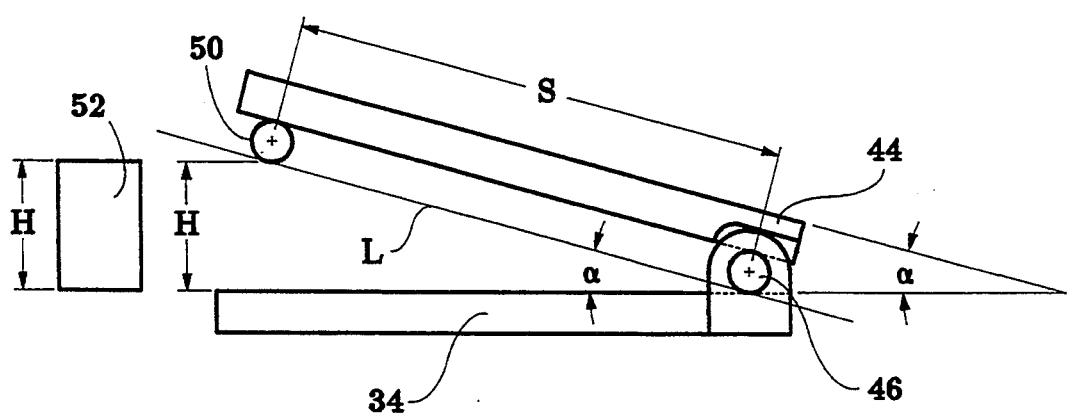
FIG. 6 is an elevational view of the stationary and hinged plates of the invention in combination with a predetermined-thickness gauge block to illustrate the formation of a precision right-angle triangle.

It is apparent from the features disclosed above that a gauge block 52 of a predetermined thickness can be attached to the reference pin assembly 50 and secured with its main axis perpendicular to the stationary plate 34 by means of the sliding knob 74, as shown in FIGS. 1 and 2, to form a correspondingly predetermined angle between the stationary and hinged plates 34 and 44, respectively. Therefore, as illustrated in FIG. 6, a specific relationship exists between the height H of a given gauge block 52 and the corresponding angle a formed between the stationary plate 34 and the hinged plate 44 when the gauge block is mounted in the miter-sine assembly as described above. Because the pivot pin 46 and the reference pin assembly 50 have identical diameters, the hinged plate 44 is perfectly parallel to an imaginary straight line L tangential to the pin 46 and the assembly 50; thus, the angle a formed between line L and the stationary plate 34 is exactly the same as the angle formed with it by the hinged plate 44. As taught by basic trigonometry, the relationship between the thickness H of a given gauge block and the angle $\alpha$ between the two plates is given by $H = S(\sin \alpha)$, where S is the distance between the main axes of the pivot pin 46 and the reference pin assembly 50.

Thus, machined gauge blocks having exact thicknesses H calculated according to this relationship can be provided to produce exact selected angles $\alpha$ between the stationary plate 34 and the hinged plate 44. Since all parts of the invention consist of machined precision components, preferably manufactured in steel or other equivalent rigid metal, the angle $\alpha$ can be set with an accuracy within seconds of a degree. Having adjusted the position of the hinged bar 44 to be perpendicular to the blade 12 and having eliminated any play between the guide bar 18 and the miter slot 16, as described above, the precision of the angle α will translate in a corresponding precision of the cutting angle of the blade 12 on a workpiece supported by the top of the hinged plate (which is used as the fence of the miter gauge) and being pushed through the saw blade in the conventional manner of using a miter gauge, as would be known to one skilled in the art.

As woodworkers would also recognize, some angular settings are most common in the industry, such as for 5, 10, 11.25, 15, 20, 22.5, 30 and 45 degrees. Therefore, gauge blocks designed to produce these precise angles are recommended for use with the miter gauge of the invention, being understood that any other angle can be produced by the same trigonometric function and that this recommendation is not intended as a limitation on the scope of this invention.

The miter gauge of this invention eliminates the necessity of setting the gauge to a certain angle by reading it on a protractor scale, thus eliminating the greatest source of error of conventional miter gauges. A user does not need to make any visual measurements or adjustments; rather, he or she only needs to select the gauge block corresponding to the desired angle α. As opposed to setting the angle α visually with a protractor, there is no practical limit to the selectivity available for choosing angles with the gauge of the invention. That is, it would be very difficult to read an angular scale to set the angle α at a fraction of a degree (such as, for example, 13.1 degrees or 13 degrees and 6 seconds), but that would be accomplished with the tool of this invention with the same degree of accuracy available for integer measurements by using a gauge block having the appropriate calculated thickness. The error involved in setting the angle α at 13.1 degrees would be the same as in setting it at 13.0 degrees and it would be dependent only on the cumulative tolerances of the machined parts, not on the ability of a user to read a protractor scale correctly. Moreover, because of the greater stability of the guide bar in the miter slot provided by the disclosed cam mechanisms, another important source of error is also greatly reduced. With respect to the improved miter gauges found in the prior art, the gauge of the present invention provides high-precision settings for any chosen angle in a single unit that can be firmly connected to a conventional table-saw top without the use of extraneous accessories.

Figure 7:
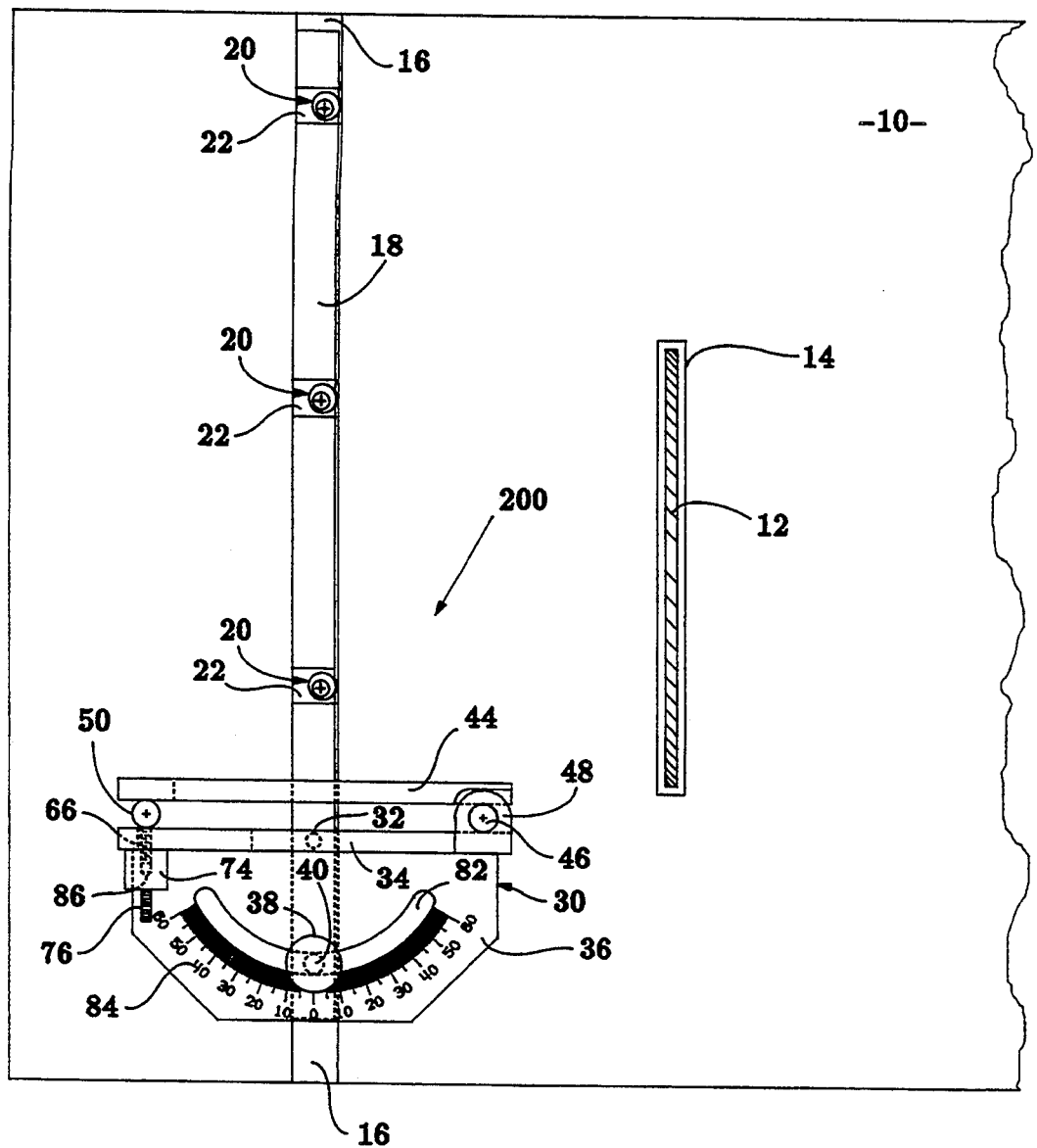
FIG. 7 is an alternative embodiment of the invention incorporating a circumferential adjustment slot and a protractor scale for coarse angle setting.

If desired, the function of standard miter gauges may be incorporated in the tool of the invention for quick and less precise angle-setting, as may be satisfactory for certain applications. This is accomplished by extending the calibration aperture 42 in the mounting plate 36 to form a curved circumferential adjustment slot 82, as illustrated in the embodiment 200 of FIG. 7. The slot 82 is circumferential to the axle mechanism 32 (shown as a dowel pin), so as to permit the rotation of the plate 36 along the length of the slot, thus causing the stationary plate 34 to form a chosen angle with the blade 12. A protractor scale 84 is also provided along the slot 82 to set the position of the plate 36 to the desired angle; the lock handle 38 is used to lock the miter-sine assembly 30 in place as described above for the preferred embodiment 100. By clamping the hinged plate 44 in closed position to the stationary plate 34, as shown in the figure, the hinged plate becomes parallel to the stationary plate and will form the same selected angle with the blade 12. The sliding knob 74 is used to secure the closed position of the hinged plate to the stationary plate by screwably mating the gauge-block mount screw 66 to an axial threaded hole 86 in the bottom of the sliding knob (see also FIG. 5). Thus, if a coarse angle setting is adequate, the hinged plate 44 of the embodiment 200 of the invention can be used readily and speedily as a fence in a standard miter gauge. If a finer setting is desirable, it is achieved by fixing the stationary plate 34 perpendicularly to the saw blade and using the miter-sine assembly 30 as disclosed herein.

Figure 8:
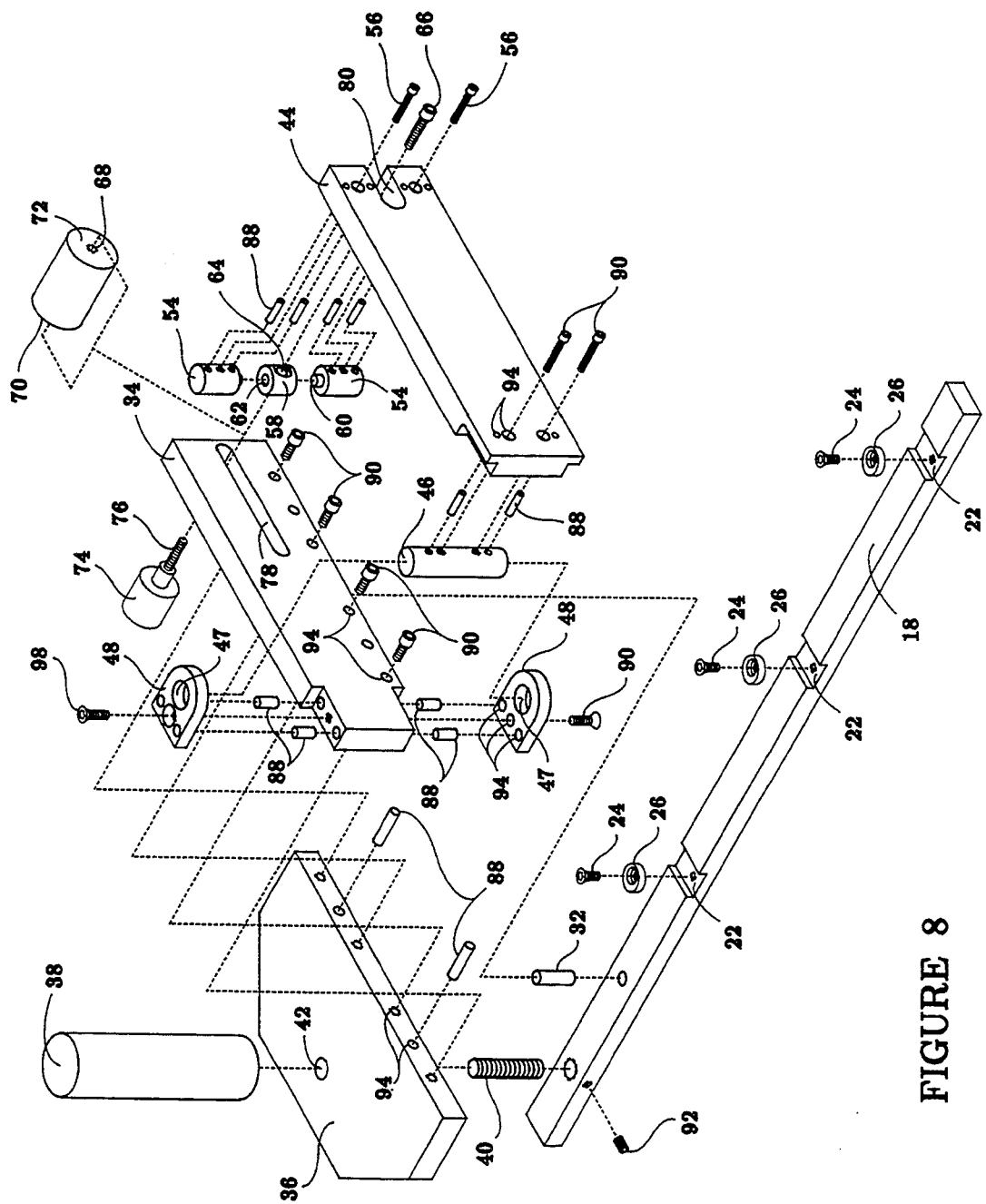
FIG. 8 is an exploded perspective view of the preferred embodiment of the invention.

FIG. 8 is an exploded view of the preferred embodiment of the invention showing all the components discussed above. In addition, the figure shows assembly components, such as dowel pins 88, cap screws 90, set screws 92, and corresponding holes 94, that are not critical to the invention but that illustrate a preferred manner of assembly. Those skilled in the art could easily find equivalent substitute assembly components; therefore, items 88 through 94 are for illustration purposes only and are not intended to be necessary parts of the invention.

Standard table-saw miter slots 16 are approximately 18.9 millimeters (0.75 inches) wide; accordingly, a guide bar 18 having approximately the same width (but not greater than that) and fitted with the disclosed cam mechanisms 20 is preferred to provide stable and tight engagement even with worn-out standard miter slots. Obviously, the width of the bar could be modified to fit any other size miter slot. I found that a pivot pin 46 and a reference pin assembly 50 having equal diameters of about 12.6 mm (0.5 inches), disposed at a distance S of approximately 151.2 mm (6.0 inches) from one another, and coupled to stationary and hinged plates about 176.4 mm long (7.0 inches) as illustrated in FIG. 6, are very suitable for the miter-sine assembly of the invention. Given these dimensions, the correct thicknesses of gauge blocks 52 corresponding to selected angles α are easily calculated by the trigonometric relationship given above.

Figure 9:
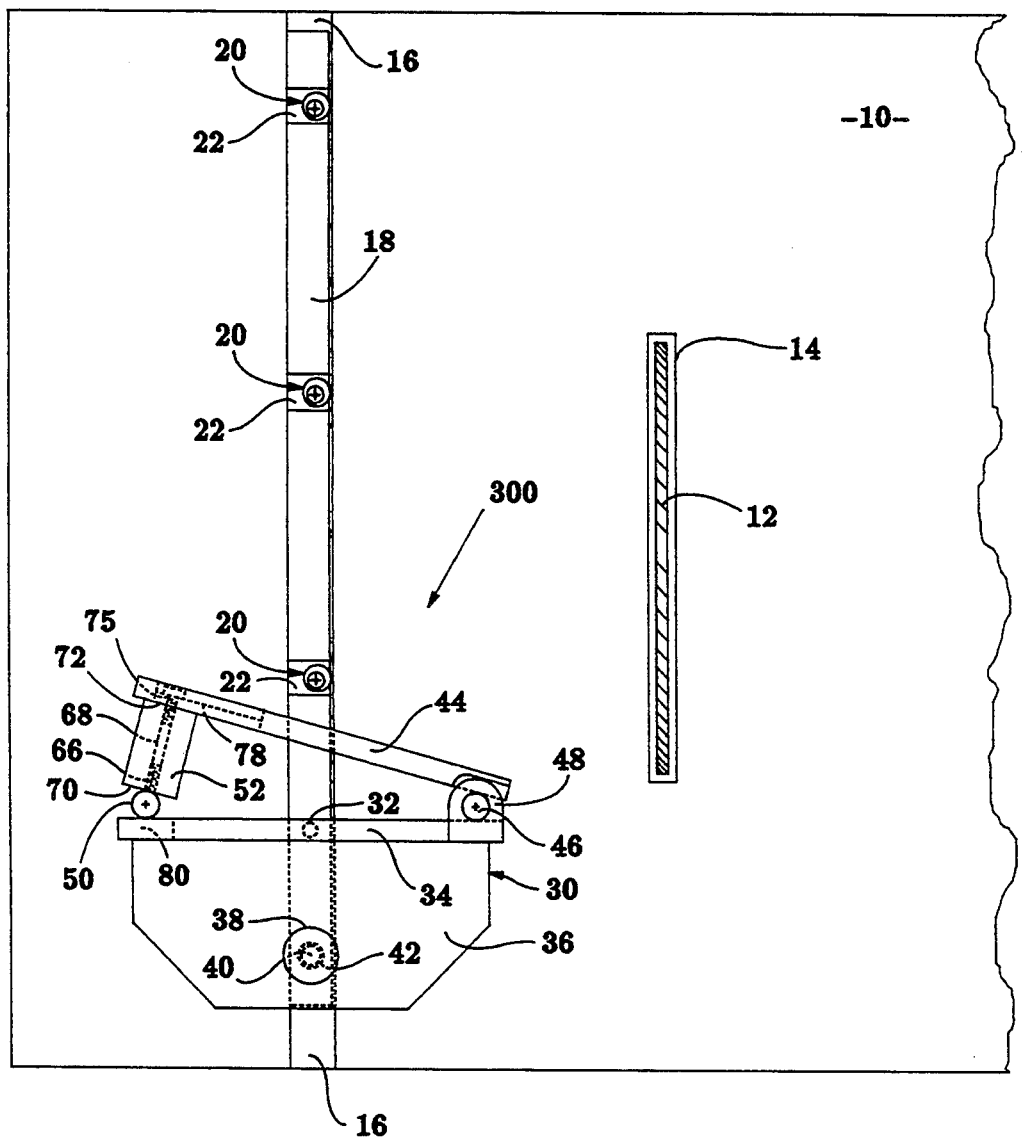
FIG. 9 is an equivalent embodiment of the invention having a different arrangement for installing the gauge blocks between the stationary and hinged plates.

Other than specifically described, the invention can obviously take other shapes with equivalent functionality and utility. For example, the stationary and hinged plates could easily be modified to have a shape other than the rectangular prisms shown in the drawings, so long as they retained flat and parallel top and bottom faces to provide the required alignment of the parts. Similarly, the method of installing the gauge blocks between the stationary and hinged plates could be reversed in equivalent apparatus without any effect on the trigonometric relationship between the desired angle α and the thickness H of the gauge blocks. This would entail having the reference pin assembly 50 attached to the stationary plate 34, as illustrated in the embodiment 300 of FIG. 9, and having the gauge block 52 set perpendicularly to the hinged plate 44. Of course, the location of the slots 78 and 80 would be reversed between the plates 34 and 44, and the sliding knob 74 would consist of a bolt head 75 (or an equivalent structure) recessed in the slot 78 to permit the positioning of a workpiece flush with the hinged plate 44. Thus, it is apparent that any shape that is not specifically described as critical for any of the components is acceptable to practice the invention so long as it retains the functional characteristics described above.

Thus, various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

I claim:

1. A precision miter gauge for positioning a workpiece at a predetermined cutting angle with respect to a blade in a conventional table saw having a miter slot adapted for use with a conventional miter gauge, comprising:
   (a) a guide bar adapted for slidable engagement within said miter slot in the table saw;
   (b) a mounting plate rotatably connected to the guide bar through pivot means disposed therebetween;
   (c) first locking means for releasably fixing the mounting plate to a predetermined angular position with respect to the guide bar;
   (d) a stationary plate rigidly attached to said mounting plate;
   (e) a hinged plate hingedly connected to said stationary plate by first hinge means and adapted to form a variable angle therebetween from zero degrees to less than 90 degrees, said hinged and stationary plates being disposed in parallel when said angle equals zero;
   (f) a plurality of gauge blocks, each having a predetermined thickness along a main axis corresponding to a desired predetermined angle between said stationary and hinged plates;
   (g) second hinge means connected to said hinged plate for hingedly fastening any one of said plurality of gauge blocks thereto; and
   (h) second locking means for releasably securing to said stationary plate said any one of said plurality of gauge blocks hingedly connected to said hinged plate, said any one of said plurality of gauge blocks being disposed with its main axis perpendicular to said stationary plate.

2. The precision miter gauge of claim 1, wherein said guide bar has a predetermined width and comprises a plurality of cam mechanisms adapted to extend beyond said width.

3. The precision miter gauge of claim 2, wherein said guide bar contains a plurality of transverse recesses and each of said plurality of cam mechanisms comprises a cylindrical axle attached to one of said recesses and an eccentric rotatably mounted on said axle.

4. The precision miter gauge of claim 3, wherein said axle consists of a screw adapted to permit the rotation of said eccentric when loosened and to lock the eccentric in place when tightened.

5. The precision miter gauge of claim 1, wherein said mounting plate contains a calibration aperture and said first locking means for releasably fixing the mounting plate to a predetermined angular position with respect to the guide bar consists of a threaded stud fixedly attached to the guide bar and protruding through said calibration aperture and of a lock handle screwably mounted on said stud and adapted to releasably press against said mounting plate, said calibration aperture being sufficiently larger than the stud to permit a rotation of the mounting plate necessary to dispose said stationary plate perpendicularly to said blade of the table saw.

6. The precision miter gauge of claim 5, wherein said calibration aperture consists of a curved adjustment slot adapted to permit the rotation of said mounting plate to cause the stationary plate to form a desired predetermined angle with the blade of the table saw; and wherein said precision miter gauge further comprises a protractor scale adapted to set the stationary plate to said desired predetermined angle with said blade.

7. The precision miter gauge of claim 1, wherein said first hinge means connecting said hinged and stationary plates consists of a cylindrical pivot pin fixedly attached to the hinged plate and rotatably mounted on pivot-pin retaining means fixedly attached to the stationary plate.

8. The precision miter gauge of claim 1, wherein said second hinge means connected to said hinged plate for hingedly fastening any one of said plurality of gauge blocks thereto consists of two cylindrical reference pins of equal diameter fixedly attached to the hinged plate and of a cylindrical gauge-block pivot mount rotatably connected to said two reference pins by means of longitudinal axial axles slideably mated therebetween, said gauge-block pivot mount containing a radial mount screw for engagement with a first threaded axial perforation in said any one of said plurality of gauge blocks.

9. The precision miter gauge of claim 1, wherein said first hinge means connecting said hinged and stationary plates consists of a cylindrical pivot pin of a predetermined diameter fixedly attached to the hinged plate and rotatably mounted on pivot-pin retaining means fixedly attached to the stationary plate; and wherein said second hinge means connected to said hinged plate for hingedly fastening any one of said plurality of gauge blocks thereto consists of two cylindrical reference pins having a diameter equal to said predetermined diameter, said reference pins being fixedly attached to the hinged plate, and further consists of a cylindrical gauge-block pivot mount rotatably connected to said two reference pins by means of longitudinal axial axles slideably mated therebetween, said gauge-block pivot mount containing a radial mount screw for engagement with a first threaded axial perforation in said any one of said plurality of gauge blocks.

10. The precision miter gauge of claim 1, wherein said stationary plate contains a longitudinal slot and said second locking means consists of a sliding knob having an axially protruding screw for engaging a second threaded axial perforation in said any one of said plurality of gauge blocks through said longitudinal slot, so that any one of said plurality of gauge blocks is firmly secured with its main axis perpendicular to the stationary plate.

11. The precision miter gauge of claim 1, wherein said guide bar has a predetermined width, contains a plurality of transverse recesses, and comprises a plurality of cam mechanisms adapted to extend beyond said width, each of said plurality of cam mechanisms comprising a cylindrical axle attached to one of said recesses and an eccentric rotatably mounted on said axle;
   wherein said mounting plate contains a calibration aperture and said first locking means for releasably fixing the mounting plate to a predetermined angular position with respect to the guide bar consists of a threaded stud fixedly attached to the guide bar and protruding through said calibration aperture and of a lock handle screwably mounted on said stud and adapted to releasably press against said mounting plate, said calibration aperture being sufficiently larger than the stud to permit a rotation of the mounting plate necessary to dispose said stationary plate perpendicularly to said blade of the table saw;

wherein said first hinge means connecting said hinged and stationary plates consists of a cylindrical pivot pin of a predetermined diameter fixedly attached to the hinged plate and rotatably mounted on pivot-pin retaining means fixedly attached to the stationary plate;

wherein said second hinge means connected to said hinged plate for hingedly fastening any one of said plurality of gauge blocks thereto consists of two cylindrical reference pins having a diameter equal to said predetermined diameter, said reference pins being fixedly attached to the hinged plate, and further consists of a cylindrical gauge-block pivot mount rotatably connected to said two reference pins by means of longitudinal axles slideably mated therebetween, said gauge-block pivot mount containing a radial mount screw for engagement with a first threaded axial perforation in said any one of said plurality of gauge blocks; and wherein said stationary plate contains a longitudinal slot and said second locking means consists of a sliding knob having an axially protruding screw for engaging a second threaded axial perforation in said any one of said plurality of gauge blocks through said longitudinal slot, so that any one of said plurality of gauge blocks is firmly secured with its main axis perpendicular to the stationary plate.

12. A precision miter gauge for positioning a workpiece at a predetermined cutting angle with respect to a blade in a conventional table saw having a miter slot adapted for use with a conventional miter gauge, comprising:
  (a) a guide bar adapted for slidable engagement within said miter slot in the table saw;
  (b) a mounting plate rotatably connected to the guide bar through pivot means disposed therebetween;
  (c) first locking means for releasably fixing the mounting plate to a predetermined angular position with respect to the guide bar;
  (d) a stationary plate rigidly attached to said mounting plate;
  (e) a hinged plate hingedly connected to said stationary plate by first hinge means and adapted to form a variable angle therebetween from zero degrees to less than 90 degrees, said hinged and stationary plates being disposed in parallel when said angle equals zero;
  (f) a plurality of gauge blocks, each having a predetermined thickness along a main axis corresponding to a desired predetermined angle between said stationary and hinged plates;
  (g) second hinge means connected to said stationary plate for hingedly fastening any one of said plurality of gauge blocks thereto; and
  (h) second locking means for releasably securing to said hinged plate said any one of said plurality of gauge blocks hingedly connected to said stationary plate, said any one of said plurality of gauge blocks being disposed with its main axis perpendicular to said hinged plate.

13. The precision miter gauge of claim 12, wherein said guide bar has a predetermined width and comprises a plurality of cam mechanisms adapted to extend beyond said width.

14. The precision miter gauge of claim 12, wherein said mounting plate contains a calibration aperture and said first locking means for releasably fixing the mounting plate to a predetermined angular position with respect to the guide bar consists of a threaded stud attached to the guide bar and protruding through said calibration aperture and of a lock handle screwably mounted on said stud and adapted to releasably press against said mounting plate, said calibration aperture being sufficiently larger than the stud to permit a rotation of the mounting plate necessary to dispose said stationary plate perpendicularly to said blade of the table saw.

15. The precision miter gauge of claim 14, wherein said calibration aperture consists of a curved adjustment slot adapted to permit the rotation of said mounting plate to cause the stationary plate to form a desired predetermined angle with the blade of the table saw; and wherein said precision miter gauge further comprises a protractor scale adapted to set the stationary plate to said desired predetermined angle with said blade.

16. The precision miter gauge of claim 12, wherein said first hinge means connecting said hinged and stationary plates consists of a cylindrical pivot pin of a predetermined diameter fixedly attached to the hinged plate and rotatably mounted on pivot-pin retaining means fixedly attached to the stationary plate; and wherein said second hinge means connected to said stationary plate for hingedly fastening any one of said plurality of gauge blocks thereto consists of two cylindrical reference pins having a diameter equal to said predetermined diameter, said reference pins being fixedly attached to the stationary plate, and further consists of a cylindrical gauge-block pivot mount rotatably connected to said two reference pins by means of longitudinal axial axles slideably mated therebetween, said gauge-block pivot mount containing a radial mount screw for engagement with a first threaded axial perforation in said any one of said plurality of gauge blocks.

17. The precision miter gauge of claim 12, wherein said hinged plate contains a longitudinal slot and said second locking means consists of a sliding knob having an axially protruding screw for engaging a second threaded axial perforation in said any one of said plurality of gauge blocks through said longitudinal slot, so that any one of said plurality of gauge blocks is firmly secured with its main axis perpendicular to the hinged plate, wherein said sliding knob is recessed within said longitudinal slot.

18. The precision miter gauge of claim 12, wherein said guide bar has a predetermined width, contains a plurality of recesses, and comprises a plurality of cam mechanisms adapted to extend beyond said width, each of said plurality of cam mechanisms comprising a cylindrical axle attached to one of said recesses and an eccentric rotatably mounted on said axle;

wherein said mounting plate contains a calibration aperture and said first locking means for releasably fixing the mounting plate to a predetermined angular position with respect to the guide bar consists of a threaded stud attached to the guide bar and protruding through said calibration aperture and of a lock handle screwably mounted on said stud and adapted to releasably press against said mounting plate, said calibration aperture being sufficiently larger than the stud to permit a rotation of the mounting plate necessary to dispose said stationary plate perpendicularly to said blade of the table saw;

wherein said first hinge means connected to said hinged plate consists of a cylindrical pivot pin of a predetermined diameter fixedly attached to the hinged plate and rotatably mounted on pivot-pin retaining means fixedly attached to the stationary plate;

wherein said second hinge means connected to said stationary plate for hingedly fastening any one of said plurality of gauge blocks thereto consists of two cylindrical reference pins having a diameter equal to said predetermined diameter, said reference pins being fixedly attached to the stationary plate, and further consists of a cylindrical gauge-block pivot mount rotatably connected to said two reference pins by means of longitudinal axial axles slideably mated therebetween, said gauge-block pivot mount containing a radial mount screw for engagement with a first threaded axial perforation in said any one of said plurality of gauge blocks; and wherein said hinged plate contains a longitudinal slot and said second locking means consists of a sliding knob having an axially protruding screw for engaging a second threaded axial perforation in said any one of said plurality of gauge blocks through said longitudinal slot, so that any one of said plurality of gauge blocks is firmly secured with its main axis perpendicular to the hinged plate.

* * * * *